United States Patent
Lankard et al.

[11] 3,760,295
[45] Sept. 18, 1973

[54] Q-SWITCH FOR SYNCHRONIZING MODE-LOCKED LASER PULSE TRANS WITH EXTERNAL EVENTS

[75] Inventors: John R. Lankard, Mahopac; Peter P. Sorokin, Millwood, both of N.Y.

[73] Assignee: International Business Machines Corporation, Armonk, N.Y.

[22] Filed: May 22, 1972

[21] Appl. No.: 255,361

[52] U.S. Cl. ............................................. 331/94.5
[51] Int. Cl. ............................................. H01s 3/11
[58] Field of Search ................................. 331/94.5

[56] References Cited
UNITED STATES PATENTS

| | | | |
|---|---|---|---|
| 3,321,714 | 5/1967 | Tien | 331/94.5 |
| 3,581,230 | 5/1971 | Smith | 331/94.5 |
| 3,586,998 | 6/1971 | Gould | 331/94.5 |
| 3,638,137 | 1/1972 | Krupke | 331/94.5 |

*Primary Examiner*—William L. Sikes
*Attorney*—George Baron et al.

[57] ABSTRACT

A capacitive discharge in cesium vapor is used to realize an externally controllable Q-switch synchronizing the appearance of pulse trains from a passively mode-locked neodymium glass laser with other events occurring on a microsecond time scale.

6 Claims, 6 Drawing Figures

Patented Sept. 18, 1973

Q-SWITCH FOR SYNCHRONIZING MODE-LOCKED LASER PULSE TRANS WITH EXTERNAL EVENTS

BACKGROUND OF THE INVENTION

For certain applications, one requires the ability to synchronize a $1\mu$ sec. long train of pulses from a mode locked laser with other events occurring on a microsecond time scale, such as, but not limited to, the firing of external flashlamps for energizing other lasers. Such requirement can be met by incorporating in the laser cavity, in addition to the usual passive mode-locking dye cell, a shutter or Q-switch which can be induced to open by such external means. Such shutter, when opened, should present very little optical loss to the laser beam within the cavity and it should also be rugged enough to resist being damaged by the passage through it of the very intense mode-locked laser pulses. Such a shutter, applicable as an optical isolator at $1.06\mu$, comprises a transparent cell containing cesium vapor heated to a temperature of 300°-400°C. At this temperature, approximately 1 to 2 percent of saturated cesium vapor consists of diatomic molecules. The cesium ($Cs_2$) molecule has a highly allowed transition ($^1\Sigma_g^+ \rightarrow {}^1\Sigma_u^+$) which gives rise to a region of strong absorption with partially resolved bands from the vicinity of the D lines to about 11,200A. There is some variance in the measurements by different investigators of the average $Cs_2$ absorption cross-section at $1.06\mu$, but a reasonable value to assume is $\approx 4 \times 10^{-16}$ cm$^2$. Hence the attenuation produced in a few centimeters of Cs vapor is enough to prevent oscillation from occurring if the vapor cell is included in the neodymium laser cavity. If the $Cs_2$ molecules are temporarily dissociated by allowing a condenser discharge to occur between a pair of electrodes in the cell, the absorption at $1.06\mu$ will be removed and the laser becomes free to oscillate.

Consequently, it is an object of this invention to provide an improved Q-switch for a laser.

It is a further object to attain synchronism between the output pulses of a mode-locked laser and other events occurring on a microsecond time scale.

It is yet another object to attain an intracavity switch for a laser which allows for the passage of very short-lived high energy pulses without being damaged thereby.

These and objects, features and advantages of the invention will be apparent from the following more particular description of the preferred embodiments of the invention as illustrated in the accompanying drawings.

DETAILED DESCRIPTION OF THE PREFERRED EMBODIMENTS

Figure 1:
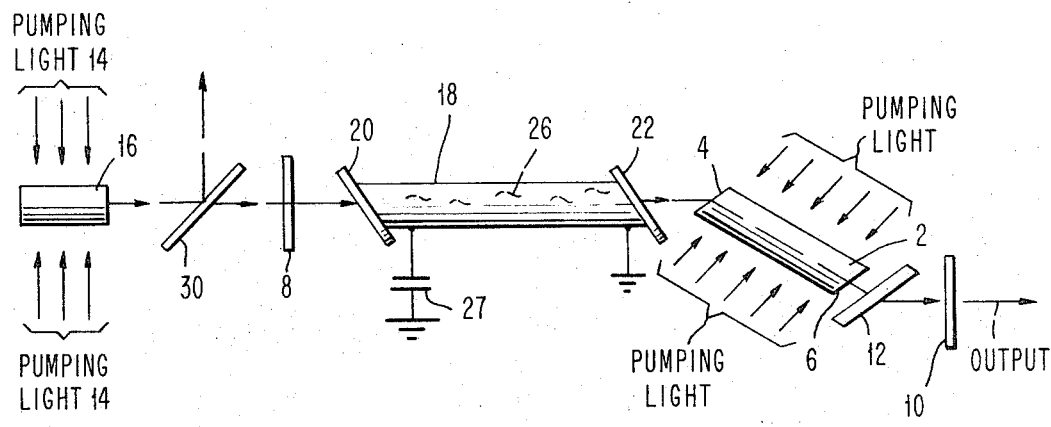
FIG. 1 is a schematic showing of an embodiment of the invention using a vaporized gas in the laser cavity as the switch for that laser, the latter employing a neodymium glass rod as its active element.

The novel laser comprises the active element 2 consisting of an eight inch long neodymium glass laser rod whose ends 4 and 6 are transparent windows cut at Brewster's angle to avoid the loss of energy of the laser beam by reflection as it passes through the rod's window 4 or 6. Mirrors 8 and 10 are high field damage mirrors with mirror 8 being 100 percent reflecting at $1.06\mu$ and 90 percent transmitting at $0.69\mu$ whereas mirror 10 is about 90-98 percent reflective at $1.06\mu$ but 2-10 percent transmissive at $1.06\mu$. Transparent cell 12 is about 1 millimeter thick and contains a mode-locking dye solution (sold by the Eastman Kodak Co. and identified as Kodak 9860) that is interposed at Brewster's angle between neodymium rod 2 and window 10. Light for pumping neodymium rod 2 surrounds the latter and is activated at the same time that light 14 of a second laser 16, i.e., a ruby laser, is used to pump such laser 16. Such synchronization is relatively easy to achieve in that the flashlamps for producing pumping light for lasing elements 16 and 2 have long pulse durations, of the order of milliseconds, whereas a train of mode-locked laser pulses would be fifty to several hundred nanoseconds in duration and each pulse in the train of the order of $10^{-11}$ seconds duration.

Interposed between mirror 8 and neodymium rod 2 is a heat-pipe discharge tube (HPDT) 18 whose ends consist of windows 20 and 22, respectively, mounted at the Brewster's angle and enclosed in such pipe 18 is pure cesium vapor 26 maintained at a pressure of 1–20 Torr. The walls of the pipe 18 (which will be described in greater detail hereinbelow in conjunction with FIG. 4) are partially covered with heating tapes to heat the cesium vapor to the desired temperature and a capacitor 27 is connected to a point on the metallic wall of pipe 18. Such capacitor is charged to 10 kilovolts, or to any other voltage, which is well below the self-flash voltage of the cesium vapor 26. In order to attain a time reference point as to when the first pulse from a train of pulses coming from the mode-locked ruby laser 16 impinges on mirror 8 of the neodymium laser, a coupling mirror 30 is used which both transmits a portion of the frequency of $0.69\mu$ of the ruby laser 16 and also reflects such frequency to any clock mechanism, not shown, for determining the time of entry of an output pulse from ruby laser 16 into the neodymium laser cavity 2.

Figure 3:
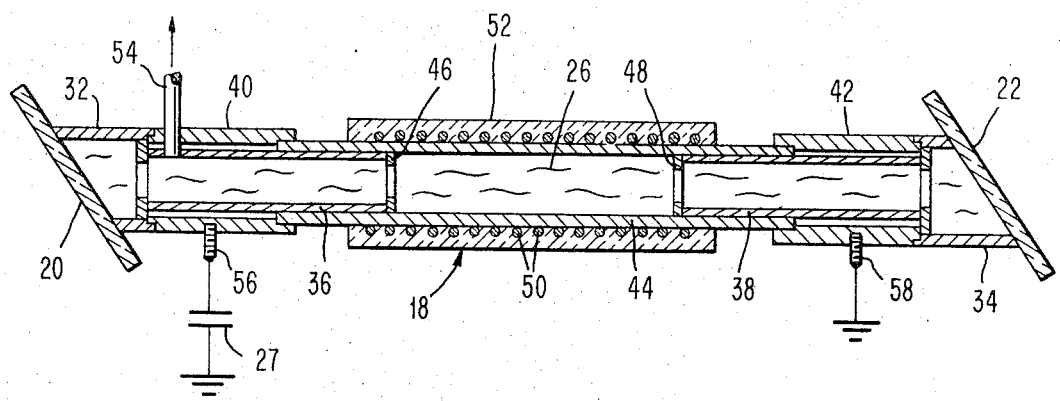
FIG. 3 is a detailed showing of the heat-pipe discharge gas tube that forms the Q-switch of the novel laser stem.

As seen in FIG. 3, the heat pipe discharge tube 18 is shown with its Brewster angle windows 20 and 22 attached to their respective flange assemblies 32 and 34. Rolls of stainless mesh 36 and 38 are supported within their respective stainless steel housings 40 and 42. Both meshes 36 and 38 protrude part way into an open ended insulated alumina tube 44, each mesh abutting against its associated electrode 46 and 48, the latter being welded internally to its associated mesh 36 and 38. Surrounding the alumina tube 44 is a heating tape 50, to which a source of current, not shown, is applied for heating the cesium vapor contained within tube 44. Asbestos covering 52 serves as an insulator for the heating element 50. Tube 54 is connected to a suitable evacuating system for achieving the appropriate pressure in the tube prior to filling the latter with cesium vapor. Connector stubs 56 and 58 are the electrical terminals through which discharge current from capacitor 27 passes. Connector 58, the negative end, is attached to housing 42 which is electrically grounded whereas connector 56 is attached to housing 40 that is attached to the positive side of capacitor 27.

Figure 2:
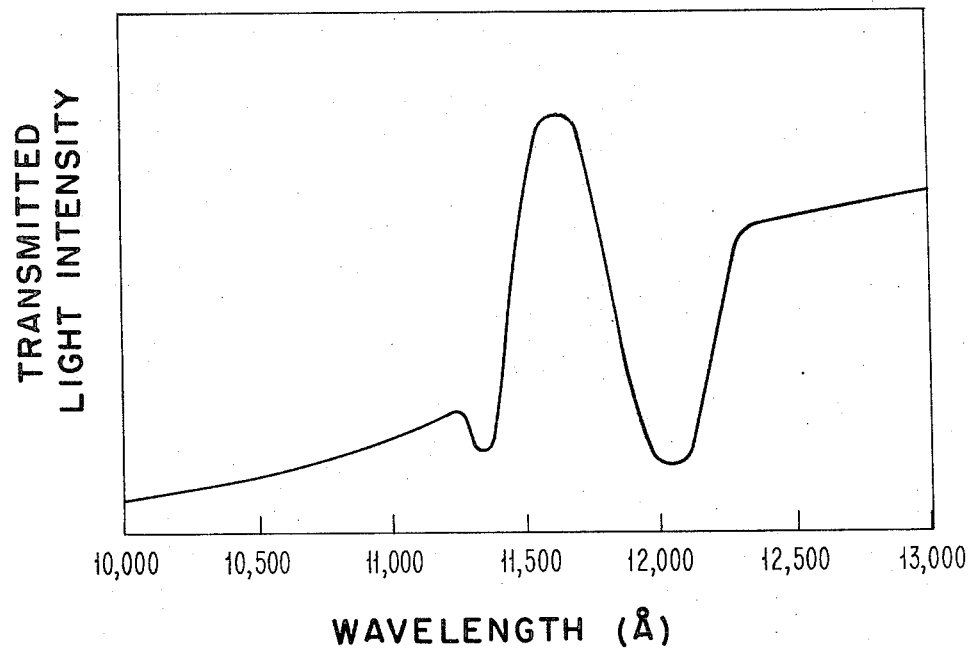
FIG. 2 is an absorption spectrum of cesium vapor, a representative gas used as a switching medium in the invention of FIG. 1.

In the operation of a working embodiment of the laser switch of FIG. 1, the heat-pipe discharge tube 18 contained cesium vapor having a pressure of 1–20 Torr. Condenser 27 was charged to about 3000 volts which is well below the self-flash voltage of the cesium for its pressure of 1 to 20 Torr and a length of cesium vapor of about one meter. Both flashlamps for the pumping of active elements of the ruby and neodymium lasers were actuated simultaneously. The neodymium laser did not lase at being pumped because the cesium molecules in the cesium vapor very strongly absorbed radiation in the $1\mu$ (10,000A) region due to the allowed absorption band $^1\Sigma_g^+ \rightarrow {}^1\Sigma_u^+$. This strong absorption is shown in FIG. 2 where the transmitted light through cesium, as a function of wavelength, with the cesium vapor being maintained at $\approx 380°C$ and the cell length containing the cesium is 2.5 cm. Calculations confirm the curve of FIG. 2. For a typical alkali metal molecule, the average cross-sections for the transition $^1\Sigma_g^+ \rightarrow {}^1\Sigma_u^+$ would be $\sim 10^{-15} cm^2$. At 300°–400°C, 1 percent of cesium vapor is molecular. Therefore, the absorption coefficient $k$ equals $n\alpha$, the latter approximately 3cm$^{-1}$ for cesium at 20 Torr. For a 50 cm. length of cesium vapor, the transmission I equals $I_0 \cdot e^{-150}$, a negligible value of the original transmission $I_0$.

Although the cesium vapor acts as a switch that prevents firing of the neodymium laser, there is no such switch in the ruby laser 16 cavity, and the ruby laser fires to emit either a giant pulse or a train of mode-locked laser pulses at the frequency of $0.69\mu$. When the emitted pulse of the ruby laser enters the neodymium laser cavity through the rear of mirror 8, such pulse is partially absorbed by cesium vapor 26 in cell 18. However, such partially absorbed laser pulse ionizes enough of the cesium vapor so that condenser 27 discharges immediately upon entry of the $0.69\mu$ ruby beam into the tube 18, the discharge occurring in a straight narrow path delineated by the ruby beam. Such discharge has been observed to occur even at condenser voltages that are one-twentieth of what is required to break down the discharge by simply overvolting the condenser 27.

The rise time of discharge could be made reasonably fast, of the order of 50 nanoseconds. In practice, after the ruby laser beam has entered the cesium-containing tube 18, condenser 27 discharges with a rise time $\approx 0.5$ microseconds to 5 microseconds, depending, for example, on the condenser circuit inductance. The discharge creates a uniform cesium plasma between electrodes 46 and 48 (See FIG. 4) of the tube 18, which plasma has no appreciable attenuation of light energy at $1.06\mu$. The formation of such plasma is effectively like the opening of a switch in that the neodymium rod 2, pumped by a flashlamp, not shown, can now emit a mode-locked train of pulses since the cavity Q of the neodymium laser is suddenly switched to a high value.

Although it is not desired to be limited by the explanation that follows, what is believed to happen is the following.

Once the discharge commences, the relatively unstable $Cs_2$ molecules are wiped out completely by the energetic electrons in the heat pipe 18. The $Cs_2$ molecules are both photodissociated and photoionized so that the absorption medium, i.e., the $Cs_2$ molecule, is removed. Even most of the cesium atoms become ionized in the discharge of the capacitor through the heat-pipe 18. Measurements of the lines emitted by the discharge, and studies of the absorption of the dye laser beams passing through the discharge, have revealed only the lines of cesium ions. For Cs(II) and Cs(III) there are no absorption bands at $1.06\mu$.

Other studies of the discharge indicate a typical electron temperature of $\approx 2$ eV, with a uniform plasma created along the bore of the tube. Measurements of dye laser transmission through the plasma show negligible-free free absorption ("inverse bremsstrahlung") for $\approx 1.06\mu$ light. These measurements agree with the formula for inverse bremsstrahlung absorption, namely, $$k \approx 3.1 \times 10^{-31} \, z^3 \, n_a^2 \, cm^{-1}/T^{3/2} \, (h\nu)^2 \text{ where}$$

$n_a$ = no. of initial atoms per cm$^3$
$z$ = degree of ionization
$T$ is in degrees $k$.
$h\nu$ is in electron volts (eV)

For $h\nu$ corresponding to $Nd^{3+}$ lasers, $n_a = 3 \times 10^{17}/cm^3$ (20 Torr at 600°K), $T \approx 25$, 600°K and $z = 1$, the value is $\approx 1/270 \, cm^{-1}$. Thus, even in a path 27 cm. long, there is only 10 percent absorption, and the pressure could be less than 20 Torr.

After the discharge of capacitor 27 and the firing of the neodymium laser, the cesium atoms must be reassociated so as to establish the normal equilibrium ratio of atoms/molecules. Before the latter occurs, the electrons and ions of the plasma will recombine. In all, these processes take about 20 milliseconds before the original state of the cesium vapor is reached.

Figure 4:
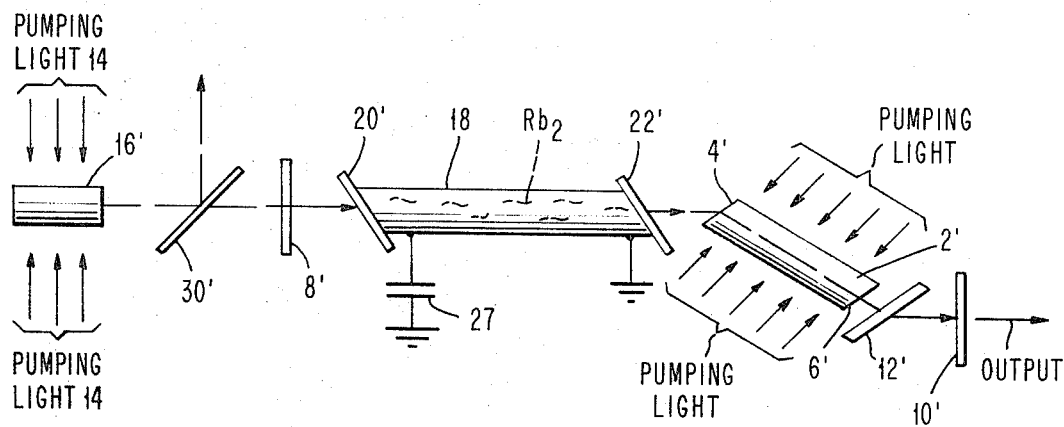
FIG. 4 is another embodiment of the invention shown in FIG. 1, save that the lasing element is a ruby rod rather than the neodymium glass rod of FIG. 1.

FIG. 4 illustrates how a train of mode-locked laser pulses from a ruby laser can be obtained within a few microseconds or so of a reference point in time, and with a jitter not exceeding a microsecond. In FIG. 4, the heat-pipe discharge tube 18 is filled with rubidium molecules ($Rb_2$) and the latter is heated via heating tapes 52 (FIG. 3) to a temperature of $\approx 400°C$. Instead of the neodymium$^{3+}$ glass rod of FIG. 1, the active element is a ruby rod 2' and the coupling slide 30', mirrors 8' and 10', Brewster angle windows 20' and 22' as well as cell 12 containing the modelocking dye are changed in value to suit the wavelengths involved. Mirror 8' transmits the neodymium laser output $1.06\mu$ into tube 18, but mirror 8' is totally reflecting at $0.69\mu$, the frequency of the ruby rod 12'. Mirror 10' transmits partially at the ruby frequency of $0.69\mu$. Thus the normal vapor of $Rb_2$ at $\approx 400°C$ prevents the ruby rod from lasing when the latter is optically pumped and capacitor 27 is charged. However, upon irradiation of the ruby laser cavity by the beam from a $Nd^{3+}$ laser, ionization is created in the rubidium-containing cell 18 and the capacitor 27 fires, the discharge of the rubidium gas makes the latter lose its absorption capability of the $0.69\mu$ frequency, and the ruby laser discharges.

Figure 6:
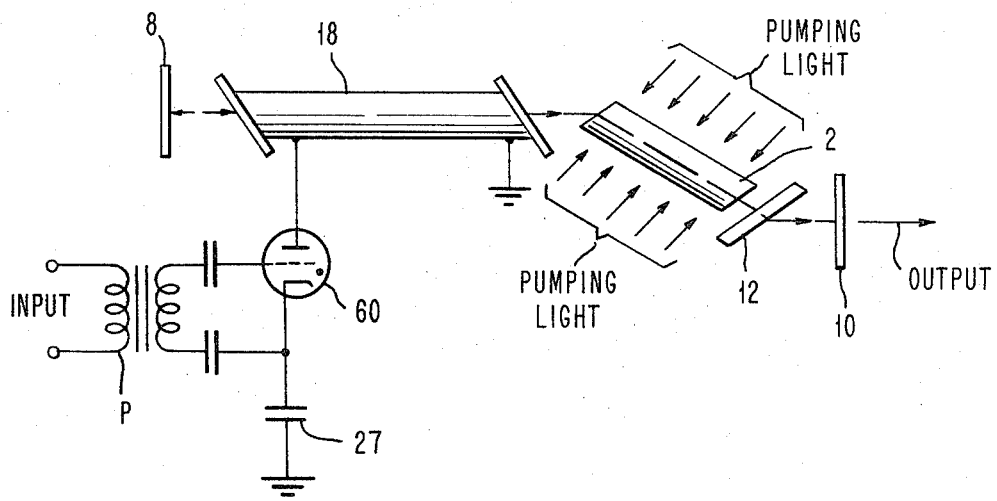
FIG. 6 is a modification of the mechanism for triggering the dissociation of the laser-frequency absorbing molecules in the heat-pipe discharge tube(HPDT).

Although the invention has been described using a laser beam in conjunction with a capacitor for dissociating the laser-frequency absorbing molecules of the gas in the HPDT 18, any means can be used to perform that function. Thus, in FIG. 6, a spark gap switch or thyratron 60 is in series with capacitor 27 and the metal housing of HPDT 18. Capacitor 27 is charged at an overvoltage for the gas used in the HPDT. When switch 60 is actuated by applying a voltage pulse to the primary winding p, switch 60 becomes conducting and the discharge of capacitor 27 starts the dissociation of the laser-frequency absorbing molecules in the HPDT 18. It is to be understood that the gas chosen as the switching mechanism in the HPDT 18 should have strong absorption bands at the frequency of the mode-locked laser beam and should not be degradable; that is, it should be easily reassociated and involve negligible chemical change. The alkali metal vapors or gases are good candidates, but others can be used that have the above noted characteristics.

The present invention is highly useful where it is desired to switch on a mode-locked laser with respect to a given time reference, so that the high-intensity train of pulses can be employed to investigate an external event whose non-linearities are under investigation. The train of pulses that are switched on serve as a stroboscope, freezing time for very short periods so that observations of a phenomenon can be made. However, many switches are not rugged enough to withstand sudden bursts of energy through them. The heat-pipe discharge tube described herein is particularly valuable for its capability of being turned on and off indefinitely without destroying the switching mechanism, namely, a gas, that suffers only ionization and dissociation, but not destruction, in allowing for the passage or non-passage of very highly energetic, short bursts of light.

Figure 5:
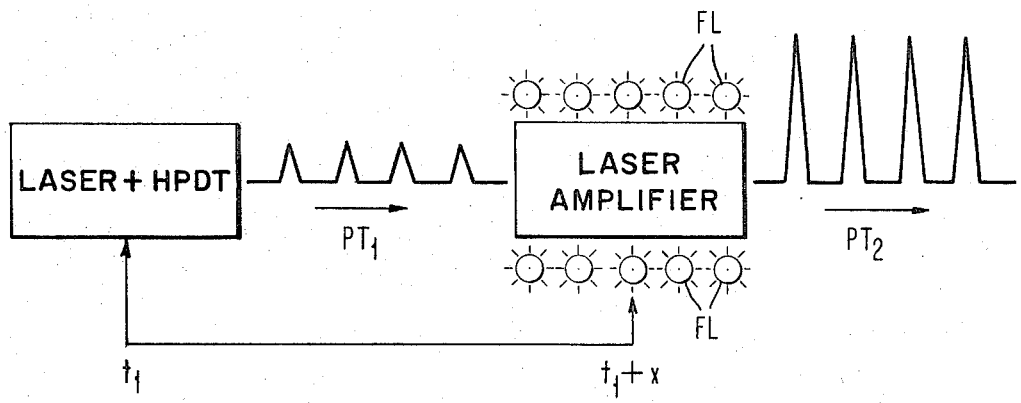
FIG. 5 is a schematic showing of the use of the invention for synchronization with an external event.

As seen in FIG. 5, a laser containing the heat-pipe discharge tube (HPDT) of this invention will have an appropriate gas within the HPDT that can serve to prevent oscillation of a laser until, at time $t_1$, that laser is fired with a pulse from a second laser, not shown. At that time $t_1$, a charged capacitor is made to discharge through the HPDT, triggering off a pulse train $PT_1$ of a mode-locked laser. Assume that it takes the HPDT in the laser cavity of the first laser about 20 microseconds to switch and the jitter of such train is only 1 microsecond. Then at some time X later, or in this specific example, $t + 20 \pm 1$ microseconds later, the flashlamp FL of a third laser, acting as an amplifier, is actuated. The laser amplifier will be synchronized with the appearance of the first pulse train $PT_1$ to produce the amplified pulse train $PT_2$.

What is claimed is:

1. In a laser capable of oscillating at a given frequency,
   a light shutter within the laser and in the path of oscillating light including a gaseous vapor whose molecules or atoms are highly absorptive of said given frequency so as to prevent lasing during pumping of said laser,
   an electrical energy storing mechanism adapted to store an energy having a value capable of dissociating or ionizing said molecules or ionizing said atoms so that said vapor becomes transparent to such frequency, and a switch interposed between said electrical energy storing mechanism and said gaseous vapor, the closing of which permits such electrical energy storing mechanism to discharge through said gaseous vapor so as to dissociate or ionize said frequency-absorbing molecules or atoms, respectively, and initiate lasing at said frequency.

2. In a laser capable of oscillating at a given frequency,
   a light shutter comprising an electrical discharge tube housing a metal vapor absorptive of said given frequency,
   means for heating said gaseous vapor to a predetermined temperature so that the latter is maintained in a gaseous state,
   a charge storing mechanism in electrical contact with said tube and adapted to store a charge below the self-flash voltage of said gaseous vapor, and
   means for injecting a laser beam through said gaseous vapor so as to trigger an ionization path in said gaseous vapor whereby said charge storing mechanism is discharged through said ionization path, creating a plasma which does not attenuate said frequency.

3. The structure of claim 2 wherein said gaseous vapor is cesium.

4. The structure of claim 2 wherein said gaseous vapor is rubidium.

5. In a laser capable of oscillating at a given frequency,
   a light shutter including an electrically conductive conduit containing a metal vapor absorptive of said given frequency,
   a neodymium rod within said cavity,
   optical pump means for pumping said neodymium rod,
   a mode-locking element in said cavity for producing a train of pulses when said rod lases,
   means for heating said gaseous vapor to a predetermined temperature so the latter is maintained in a gaseous state,
   an electrical charge storing mechanism in electrical contact with said tube and adapted to store a charge below the self-flash voltage of said gaseous vapor, and
   means for injecting an external laser beam through said gaseous vapor so as to trigger an ionization path in said gaseous vapor so that said charge-storing mechanism is discharged through said ionization path, creating a plasma which does not attenuate said given frequency so that said neodymium rod lases, said gaseous vapor becoming absorptive again of said given frequency when the atoms of said gaseous vapor plasma reassociates to its normal equilibrium ratio of atoms to molecules.

6. A laser capable of emitting a train of mode-locked pulses at a given frequency,
   a gaseous vapor contained within a housing within said laser, said vapor being highly absorptive of lasing energy at said given frequency,
   means for applying a stored charge to said housing which is below the self-flash voltage of said gaseous vapor,
   a laser amplifier capable of amplifying said mode-locked laser pulses,
   means for triggering said vapor into ionization so as to discharge said stored charge through said vapor so as to ionize the latter into a plasma which does not attenuate lasing energy at said frequency, said time of forming said non-absorbing plasma having a value of t microseconds, and
   means for actuating said laser amplifier at a time t microseconds after triggering said laser so that said train of mode-locked pulses can be amplified by said laser amplifier.

* * * * *

UNITED STATES PATENT AND TRADEMARK OFFICE
CERTIFICATE OF CORRECTION

PATENT NO. : 3,760,295
DATED : September 18, 1973
INVENTOR(S) : John R. Lankard and Peter P. Sorokin It is certified that error appears in the above-identified patent and that said Letters Patent are hereby corrected as shown below:

On the cover sheet [54], in the title TRANS should be

--TRAINS--.

Signed and Sealed this thirtieth Day of September 1975

[SEAL]

Attest:

RUTH C. MASON
Attesting Officer

C. MARSHALL DANN
Commissioner of Patents and Trademarks